(12) United States Patent
Durham et al.

(10) Patent No.: US 9,602,490 B2
(45) Date of Patent: Mar. 21, 2017

(54) USER AUTHENTICATION CONFIDENCE BASED ON MULTIPLE DEVICES

(71) Applicant: Intel Corporation, Santa Clara, CA (US)

(72) Inventors: Lenitra M. Durham, Beaverton, OR (US); Deepak S. Vembar, Portland, OR (US); John C. Weast, Portland, OR (US); Cory J. Booth, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 11 days.

(21) Appl. No.: 14/536,900

(22) Filed: Nov. 10, 2014

(65) Prior Publication Data

US 2016/0134609 A1    May 12, 2016

(51) Int. Cl.
*G06F 17/30* (2006.01)
*H04L 29/06* (2006.01)

(52) U.S. Cl.
CPC .......... *H04L 63/08* (2013.01); *H04L 63/0861* (2013.01); *H04L 63/105* (2013.01)

(58) Field of Classification Search
USPC ............................................................ 726/7
See application file for complete search history.

(56) References Cited

U.S. PATENT DOCUMENTS

| | | | |
|---|---|---|---|
| 6,275,707 B1 | 8/2001 | Reed et al. | |
| 7,039,951 B1 * | 5/2006 | Chaudhari | G10L 17/06 340/5.84 |
| 7,627,895 B2 * | 12/2009 | Gifford | G06F 21/32 235/380 |
| 9,043,887 B2 * | 5/2015 | McLachlan | G06Q 20/4014 705/2 |
| 2004/0039917 A1 | 2/2004 | Ross | |
| 2004/0127198 A1 * | 7/2004 | Roskind | H04M 1/72566 455/412.2 |

(Continued)

FOREIGN PATENT DOCUMENTS

WO        03017597        2/2003

OTHER PUBLICATIONS

International Search Report and Written Opinion received from related application PCT/US2015/055434 mailed Jan. 29, 2016.

*Primary Examiner* — Amare F Tabor
(74) *Attorney, Agent, or Firm* — Grossman, Tucker, Perreault & Pfleger, PLLC

(57) ABSTRACT

The present application is directed to user authentication confidence based on multiple devices. A user may possess at least one device. The device may determine a device confidence level that the identity of the user is authentic based on at least data collected by a data collection module in the device. For example, a confidence module in the device may receive the data from the data collection module, determine a quality corresponding to the data and determine the device confidence level based on the quality. If the user possesses two or more devices, at least one of the devices may collect device confidence levels from other devices to determine a total confidence level. For example, a device may authenticate the other devices and then receive device confidence levels for use in determining the total confidence level, which may be used to set an operational mode in a device or system.

20 Claims, 6 Drawing Sheets

(56) References Cited

U.S. PATENT DOCUMENTS

| | | | |
|---|---|---|---|
| 2005/0221798 A1* | 10/2005 | Sengupta | H04M 1/67 455/411 |
| 2006/0074986 A1 | 4/2006 | Mallalieu et al. | |
| 2007/0241861 A1 | 10/2007 | Venkatanna et al. | |
| 2008/0216171 A1* | 9/2008 | Sano | H04L 9/32 726/19 |
| 2009/0146947 A1* | 6/2009 | Ng | G06F 3/014 345/156 |
| 2009/0305744 A1* | 12/2009 | Ullrich | H04M 1/72569 455/567 |
| 2010/0192209 A1* | 7/2010 | Steeves | G06F 21/316 726/7 |
| 2011/0214171 A1* | 9/2011 | Wolfond | G06F 21/31 726/7 |
| 2012/0137340 A1 | 5/2012 | Jakobsson et al. | |
| 2012/0144468 A1* | 6/2012 | Pratt | G06F 21/40 726/7 |
| 2012/0159590 A1* | 6/2012 | Novack | H04L 9/3231 726/7 |
| 2012/0309354 A1* | 12/2012 | Du | H04W 12/12 455/411 |
| 2014/0101755 A1* | 4/2014 | Tang | G06F 21/35 726/20 |

\* cited by examiner

USER AUTHENTICATION CONFIDENCE BASED ON MULTIPLE DEVICES

TECHNICAL FIELD

The present disclosure relates to access control, and more particularly, to a system that may determine a confidence of user authenticity based on the contribution of multiple devices.

BACKGROUND

As new electronic communication technologies emerge and the variety of mobile devices on the market continues to expand, it has become normal to handle many daily activities through electronic interaction. Mobile devices have evolved from cellular handsets that allowed users to make voice calls to powerful do-all tools. For example, "smart phones" may comprise a variety of applications through which personal, confidential and/or proprietary data may be conveyed to communicate with family, friends or professional colleagues, perform financial transactions, etc. Newer technologies may further involve the user of close-proximity wireless communication for access control to a user's home, secure facilities, etc. The capability to perform these activities has created an attraction for people that may desire to gain unauthorized access to these devices for less-than-reputable purposes (e.g., hackers). Hackers may attempt to gain access to a device by impersonating an authorized user of the device. Once access is gained, the data in the device and any other device with which the device has-interacted, or may interact, becomes vulnerable.

Software and device designers, manufacturers, etc. have attempted to establish security measures to combat hackers. However, the ingenuity of hackers continues to evolve with new protections to thwart them. Biometric technologies, which may comprise the measurement of human characteristics or traits as a means of identification, have garnered substantial attention in recent years because security measures based on biometrics are harder to overcome. Different types of biometric sensors may provide different levels of scrutiny. For example, user identity authentication systems utilizing blood vessel mapping, retina mapping, electrocardiogram (EKG) matching, etc. may provide extremely high accuracy for authenticating user identity, but due to hardware and processing requirements, may not be feasible for implementing in smaller mobile devices (e.g., such as "wearable" devices). Moreover, it would be cumbersome to require a user to repeatedly perform these types of biometric identification to ensure that the mobile device is still in the possession of the authenticated user. Any security measures having requirements that may become burdensome to users may become useless as users would tend to avoid using them.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
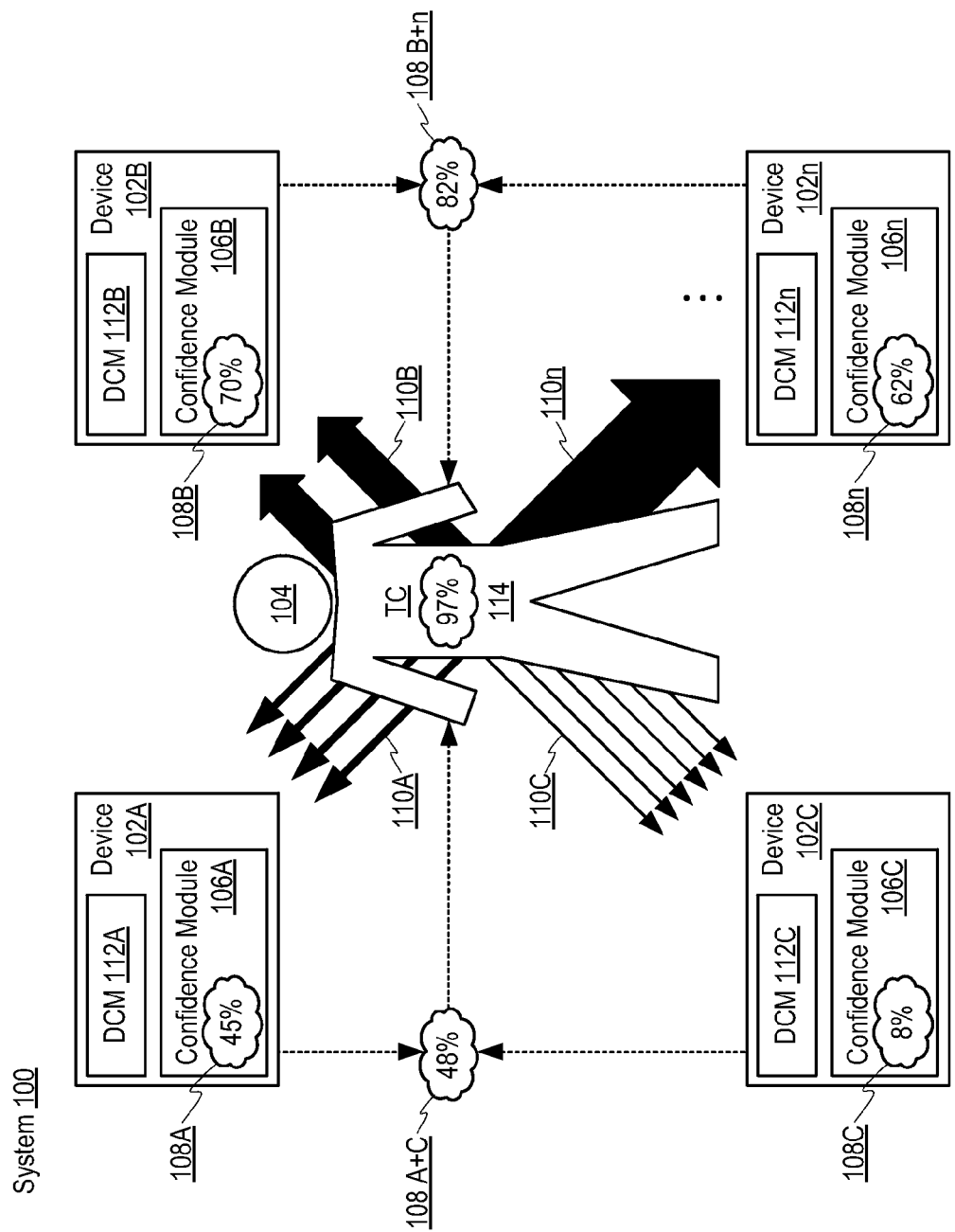
FIG. 1 illustrates an example system for user authentication confidence based on multiple devices in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present application is directed to user authentication confidence based on multiple devices. A user may possess at least one device. The device may determine a device confidence level that the identity of the user is authentic based on data collected by a data collection module in the device. For example, the data may include biometric data sensed by a sensor in the device. A confidence module in the device may receive the data collected by the data collection module, determine a quality corresponding to the data and determine the device confidence level based on the quality. Quality may be determined based on, for example, data type, data frequency, data accuracy and/or data consistency. If the user possesses two or more devices, at least one of the devices may receive device confidence levels from the other devices in the user's possession to determine a total confidence level. For example, a device may authenticate the other devices and then receive device confidence levels for use in determining the total confidence level. The total confidence level may be employed for setting an operational mode in a device in possession of the user, in a separate device or system, etc. Further to the total confidence level, other criteria may be utilized in setting the operational mode such as the presence of a required device, device context, etc. The operational mode may be rudimentary (e.g., simply "access" or "no access") or may include a plurality of levels that each correspond to different levels of the total confidence.

In at least one embodiment, a device for determining confidence of user identity may comprise, for example, a communication module, a data collection module and a confidence module. The communication module may be to interact with at least one other device. The data collection module may be to collect data for use in determining an identity of a user in possession of the device. The confidence module may be to at least receive the data from the data collection module and to determine a device confidence level that the identity of the user is authentic based on at least the data.

In at least one embodiment, the data may comprise biometric data sensed by at least one sensor in the device. The confidence module may comprise a device confidence module to at least determine a quality of the data and determine the device confidence level based on at least the data quality. The data quality may be determined based on, for example, at least one of data type, data frequency, data accuracy and sensor data consistency. The confidence module may further be to cause the communication module to transmit at least the device confidence level to the at least one other device.

In the same or a different embodiment, the confidence module may further comprise an authentication and collection module to at least receive at least one device confidence level from the at least one other device and determine a total confidence level based on the device confidence level determined in the device and the at least one device confidence level received from the at least one other device. The authentication and collection module may further be to receive authentication data from the at least one other device and authenticate the at least one other device based on the authentication data prior to determining the total confidence level. In addition, the confidence module may further be to set an operational mode in the device based on at least the identity of the user in possession of the device and the confidence level. The operational mode may also be set based on a context of at least one of the device or the user.

In at least one embodiment, an access control device may comprise a communication module and a confidence module. The communication module may be to interact with at least one other device. The confidence module may be to at least receive data identifying a user in possession of the at least one other device and a confidence level that the data identifying the user is authentic via the communication module and set an operational mode in the device based on at least the user identity data and the confidence level. The confidence module may further be to determine whether the user is in possession of a required device and set the operational mode based further on whether the required device is determined to be in possession of the user. The operational mode may be set by the confidence module based further on, for example, a context of at least one of the device of user determined based on at least the data. The operational mode may comprise, for example, a plurality of increasing levels of access set corresponding to at least the confidence level. The confidence level may be determined based on at least a quality determined for data used in determining the identity of the user in possession of the at least one other device collected by a data collection module in the at least one other device.

FIG. 1 illustrates an example system for user authentication confidence based on multiple devices in accordance with at least one embodiment of the present disclosure. Example system 100 may comprise device 102A, device 102B, device 102C . . . device 102n (collectively, "devices 102A . . . n"). While only four devices 102A . . . n are illustrated in system 100, the use of only four devices 102A . . . n is merely for the sake of explanation herein. The notation "A . . . n" represents that the number of devices 102A . . . n in system 100 is unlimited. Examples of devices 102A . . . n may comprise, but are not limited to, mobile communication devices such as a cellular handset, smart phone, etc. based on the Android® operating system (OS) from the Google Corporation, iOS® from the Apple Corporation, Windows® OS from the Microsoft Corporation, Mac OS from the Apple Corporation, Tizen™ OS from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., mobile computing devices such as a tablet computer like an iPad® from the Apple Corporation, Surface® from the Microsoft Corporation, Galaxy Tab® from the Samsung Corporation, Kindle Fire® from the Amazon Corporation, etc., an Ultrabook® including a low-power chipset manufactured by Intel Corporation, netbooks, notebooks, laptops, palmtops, etc., wearable devices such as wristwatch form factor computing devices like the Galaxy Gear® from Samsung, eyewear form factor interfaces like Google Glass® from the Google Corporation, devices that may be affixed to a user or a user's clothing for monitoring various parameters such as location, speed and/or acceleration, physical condition and/or physical expenditures, etc., clothing articles equipped with integrated sensing equipment, etc. Devices 102A . . . n may be in the possession of user 104. As referenced herein, "possession" may include example scenarios wherein devices 102A . . . n are being held by user 104 (e.g., user 104 may hold a mobile device such as a smart phone, tablet computer, etc., "smart" equipment including computing resources such as tools, sporting goods, musical instruments, etc.), are worn by user 104 (e.g., "wearable"), are stored in a pocket of user 104, are carried in bag by user 104, or simply in physical contact with user 104 for some duration of time. Being in physical contact with user 104 may comprise at least one device 102A . . . n being proximate to, or in actual surface-to-surface contact with, the skin or another body part of user 104. Examples of physical contact may include a hand of user 104 being placed upon a sensor pad, doorknob or door handle, a handhold of a bicycle, exercise equipment, etc. wherein a device 102A . . . n may be embedded in the pad, handle, handhold, etc.

Consistent with the present disclosure, devices 102A . . . n may include at least confidence module 106A, confidence module 106B, confidence module 106C . . . confidence module 106n (collectively, "confidence modules 106A . . . n") and data collection module (DCM) 112A, DCM 112B, DCM 112C . . . DCM 112n (collectively, "DCMs 112A . . . n"), respectively. Confidence modules 106A . . . n may be configured to at least determine device confidence (DC) level 108A, DC level 108B, DC level 108C . . . DC level 108n, in devices 102A . . . n, respectively (collectively, "DC levels 108A . . . n"). DC levels 108A . . . n may correspond to a level of confidence that a user identity, as determined by each of devices 102A . . . n, is authentic (e.g., that the current user 104 in possession of devices 102A . . . n is the user 104 that was last identified by devices 102A . . . n). User identity may be determined based data collected by DCMs 112A . . . n. The data collected by DCMs 112A . . . n may comprise, for example, device-related data (e.g., device identification (ID) data, device configuration data, addressing (e.g., media access control (MAC) address, Bluetooth address, etc.), user-related data (e.g., user ID data, account numbers, passwords, etc.), contextual data (e.g., data that may place devices 102A . . . n and/or user 104 into a certain context such as a particular location, activity, etc.), data sensed by various sensors within devices 102A . . . n, etc.

For example, the data collected by DCMs 112A . . . n may comprise data 110A, data 110B, data 110C . . . data 110n (collectively, "data 110A . . . n). In FIG. 1, the visual representation of data 110A . . . n may correspond to a type of data being collected. For example, data 110C may correspond to at least one sensor in device 102C that is configured to sense a small amount of data sampled on a relatively frequent basis (e.g., multiple times per minute). An example of a device 102A . . . n that may accumulate data 110C is a physiological condition/activity/exercise monitor (e.g., a pedometer, heart rate monitor, blood sugar monitor, etc.). While the "freshness" (e.g. high sample rate) of data 110C may be desirable from the standpoint of deriving confidence that a determined user identity is correct, data like pulse, blood pressure, a number of strides, pace detection (e.g., the stride length of a person walking/running), blood sugar level, etc. may provide limited benefit for biometric identification (e.g., it may be difficult to identify user 104 relying only on data 110C), and thus, DC level 108C may be relatively low (e.g., 8%). It is important to note that DC levels 108A . . . n as illustrated in FIG. 1 are merely representative, and have been selected simply to aid in the explanation of the disclosure.

Conversely, data 110n may comprise a substantial amount of data usable for user identity attestation sampled on an infrequent basis. For example, device 102n may comprise at least one scanner for use in identifying user 104 based on fingerprints, facial features, finger blood vessel mapping, etc. Data 110n may provide good accuracy for use in biometric identification, which may increase DC level 108n. However, data capture and/or identity determination may occur only sporadically (e.g., when device 102n is activated, unlocked, a certain application is accessed, etc.), and thus there is ample opportunity for device 102n to depart from the possession of user 104 (e.g., be left somewhere, stolen, etc.) without data 110n being updated. As a result, device confidence level 108n is only 62%.

The collection of data 110A and 108B may fall within the aforementioned range. Data 110A may be updated less frequently than data 110C, but may comprise more information. For example, data 110A may comprise a username, password, symbol, etc. entered to unlock device 102A. This information may be beneficial on its face because it is an assertion of the identity of a user (e.g., through the entry of a username, password and/or symbolic identifier). However, this type of data is not biometric, and thus, does not require the actual presence of user 104 for collection. It may be possible for an unauthorized party to obtain a username, password, symbol, etc. Data 110A may also comprise data types that are available regularly but may not be totally definitive in regard to user identity, such as an exercise device that can perform gait detection (e.g., the identification of motion-related characteristics in how user 104 walks, runs, etc.). In this instance, data 110A may be obtained regularly, but may vary substantially based on whether user 104 is walking or running, the type of shoes user 104 is wearing, etc. As a result, DC level 108A is better than DC level 108C, but is still only 45%. Data 110B may comprise a substantial amount of data useful for determining the identity of user 104 and may be sampled on a regular basis from user 104. For example, device 102B may be a wearable in contact with the skin of user 104 (e.g., wristwatch-format device, eyewear, etc.). Device 102B may be capable of determining galvanic skin response to identify user 104. If eyewear, device 102B may be able to identify user 104 based on retina or corneal reflection scanning, etc. In this instance, data 110B provides a large amount of data usable for determining/confirming the identity of user 104. Device 102B may be worn against the skin on a regular basis, allowing data 110B to be sensed flexibly (e.g., as needed, periodically as determined by device configuration, etc.). Thus, DC level 108B may be relatively high at 70% when compared to other DC levels 108A, C . . . n.

Figure 2:
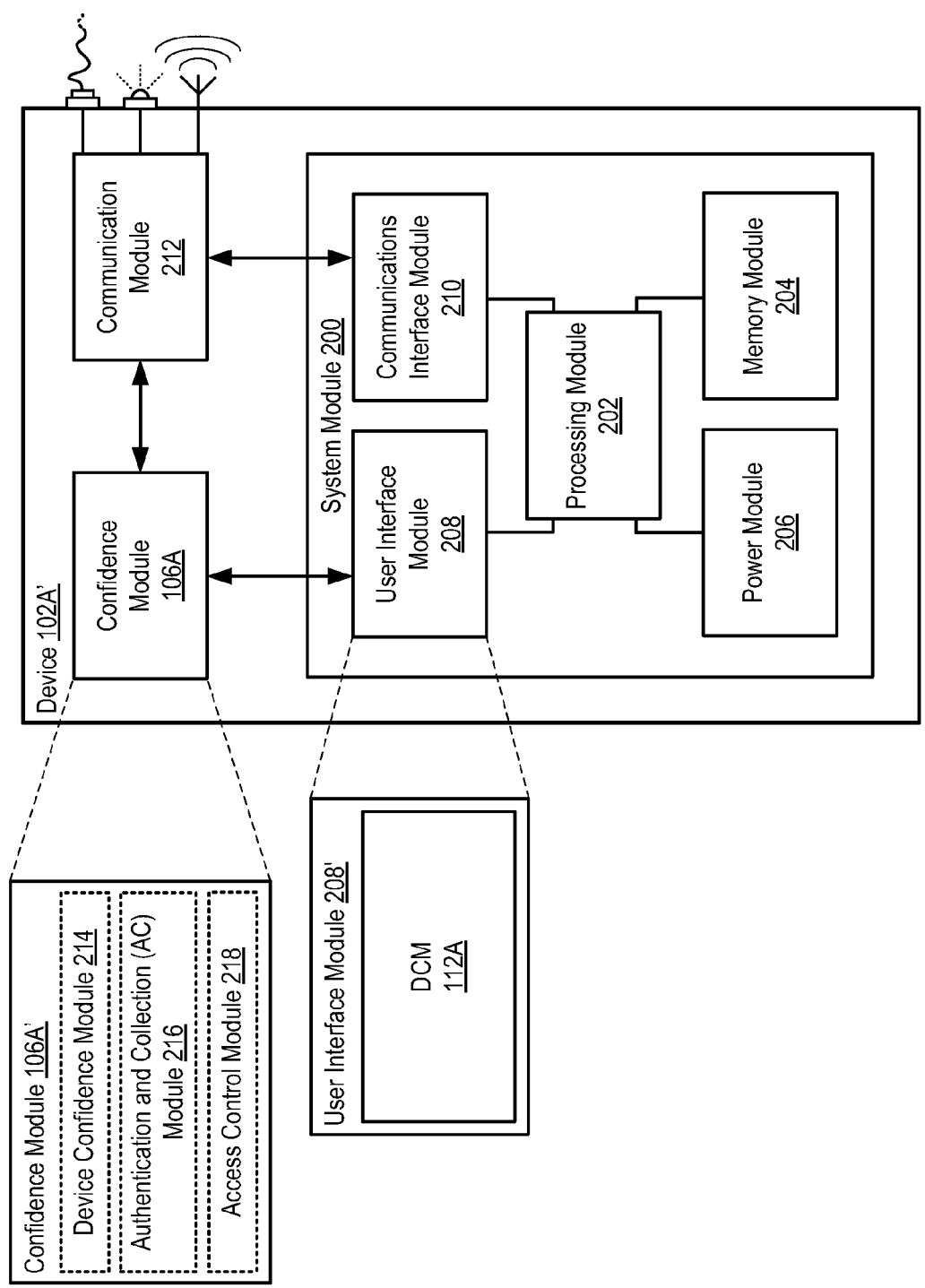
FIG. 2 illustrates an example configuration for a device usable in accordance with at least one embodiment of the present disclosure.

Device confidence levels 108A . . . n demonstrate that the capability of devices 102A . . . n to authenticate the identity of user 104, taken individually may be limited. However, leveraging the individual abilities of devices 102A . . . n in a combined effort may be able to provide much higher confidence levels in regard to the identity of user 104. Consistent with the present disclosure, at least one device 102A . . . n may determine total confidence (TC) level 114 based on individual DC levels 108A . . . n. An example of this activity is disclosed in a progressive manner in system 100. As illustrated in FIG. 2, DC level 108A may be combined with DC level 108C to yield a DC level 108A+C at 48%, while DC level 108B may be combined with DC level 108n to yield a DC level 108B+n at 82%. The determination of DC level 108A+C may be based on different methodologies, algorithms, etc. For example, the aggregation of DC levels 108A . . . n may utilize a weighted average with emphasis being given to DC levels 108A . . . n that contribute more to the authentication of user identity. In an alternative embodiment, a rule-based algorithm, learning engine, etc. may be employed that may evaluate, for example, the type of data 110A . . . n being sampled (e.g. from where is the data sourced, the content of the data, the trustworthiness of the data, etc.), the frequency at which sensor data 110A . . . n is being collected (e.g. how fresh is the data), the accuracy of the data (e.g., is the data user-submitted, if the data is sensed: from what type of sensor is the data sensed, where is the sensor mounted, what kind of resolution does the sensor provide, etc.) in determining how combined device confidence levels may be formulated.

Combined DC levels (e.g., 108A+C and 108B+n) may also be influenced by secondary criteria. For example, if DCM 112A . . . n are capable of collecting at least some common data 110A . . . n, respectively, then the corresponding data may be compared. If it is determined that DCM 112B and n are sensing the same quantities for common sensor data 110B and n (e.g., that devices 102B and n may both detect geographic position, acceleration, speed, pulse, etc.), then data 110B and n may be compared to affirm that both devices 102B and n are in the possession of the same user 104, which may lend further support to the confidence that the identity of user 104 is authentic (e.g., may result in device confidence level 108B+n being 85% instead of 82%). TC level 114 disclosed in FIG. 1 is 97%, which may result from combining DC levels 108A . . . n. Even though the DC levels 108A . . . n may be substantially lower than what may customarily provide confidence that the determined identity of user 104 is authentic, TC level 114 may be of a level that provides a much higher level of confidence based on the contributions of devices 102A . . . n. To provide an example context for understanding practical usage, user 104 may possess devices 102A . . . n on a daily basis. Device 102A could be a smart phone in a pocket of user 104, device 102B could be a wearable like eyewear including processing and display features, device 102C could be a fitness monitor and device 102n could be a tablet computer carried in a bag by user 104. Devices 102A . . . n may continually formulate DC levels 108A . . . n, while at least one device 102A . . . n may formulate TC level 114. TC level 114 may then be used internally (e.g., to control access to any or all of devices 102A . . . n) or externally in a variety of security-related applications. An example configuration for devices 102A . . . n is disclosed in FIG. 2. Example uses for TC level 114 generated by system 100 are disclosed in FIGS. 3 and 4.

FIG. 2 illustrates an example configuration for a device usable in accordance with at least one embodiment of the present disclosure. Device 102A' may be capable of executing example functionality such as disclosed in FIG. 1. However, device 102A' is meant only as an example of an apparatus that may be usable in embodiments consistent with the present disclosure, and is not meant to limit the various embodiments to any particular manner of implementation. Device 102A', as shown in FIG. 2, may be generally representative of devices 102A . . . n in that any or all of devices 102A . . . n may be configured similarly.

However, certain devices 102A . . . n may add or omit features based on, for example, the certain implementation for which they were designed.

Device 102A' may comprise, for example, system module 200 configured to manage device operations. System module 200 may include processing module 202, memory module 204, power module 206, user interface module 208 and communication interface module 210. Device 102A' may further include confidence module 106A and communication module 212. While confidence module 106A and communication module 212 have been shown as separate from system module 200, the example implementation illustrated in FIG. 2 has been provided merely for the sake of explanation. Some or all of the functionality associated with confidence module 106A and/or communication module 212 may be incorporated into system module 200.

In device 102A', processing module 202 may comprise one or more processors situated in separate components, or alternatively, one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series, Quark product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in device 102A'. Some or all of the functionality commonly associated with the support circuitry may also be included in the same physical package as the processor (e.g., such as in the Sandy Bridge family of processors available from the Intel Corporation).

Processing module 202 may be configured to execute various instructions in device 102A'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) or read-only memory (ROM) in a fixed or removable format. RAM may include volatile memory configured to hold information during the operation of device 102A' such as, for example, static RAM (SRAM) or Dynamic RAM (DRAM). ROM may include non-volatile (NV) memory modules configured based on BIOS, UEFI, etc. to provide instructions when device 102A' is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power module 206 may include internal power sources (e.g., a battery, fuel cell, etc.) and/or external power sources (e.g., power grid, electromechanical or solar generator, external fuel cell, etc.), and related circuitry configured to supply device 102A' with the power needed to operate. User interface module 208 may include hardware and/or software to allow users to interact with device 102A' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). Any hardware needed to support functionality in user interface module 208 may be incorporated within device 102A' and/or may be coupled to device 102A' via a wired or wireless communication medium.

Communication interface module 210 may be configured to manage packet routing and other control functions for communication module 212, which may include resources configured to support wired and/or wireless communications. In some instances, device 102A' may comprise more than one communication module 212 (e.g., including separate physical interface modules for wired protocols and/or wireless radios) managed by a centralized communication interface module 210. Example wired communications may include serial and parallel wired mediums such as Ethernet, Universal Serial Bus (USB), Firewire, Thunderbolt, Digital Video Interface (DVI), High-Definition Multimedia Interface (HDMI), etc. Example wireless communications may include close-proximity wireless mediums (e.g., radio frequency (RF) communications such as based on the RF identification (RFID) or Near Field Communications (NFC) standards, infrared (IR), body-coupled communications, etc.), short-range wireless mediums (e.g., Bluetooth, WLAN, Wi-Fi, etc.), long range wireless mediums (e.g., cellular wide-area radio communication technology, satellite-based communications, etc.), electronic communications via sound waves, etc. In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission. While the embodiment disclosed in FIG. 2 illustrates communication interface module 210 being separate from communication module 212, it may also be possible for the functionality of communication interface module 210 and communication module 212 to be incorporated into the same module.

Consistent with the present disclosure, confidence module 106A may optionally comprise at least one of device confidence module 214, authentication and collection (AC) module 216 or access control module 218. For example, a rudimentary device 102A' (e.g., a wearable fitness tracker) may only comprise the resources needed to support device confidence module 214 that may allow the rudimentary device 102A' to determine DC level 108A. A more powerful device 102A' (e.g., a smart phone) may also comprise AC module 216 to collect DC levels 108B . . . n from devices 102B . . . n for use in determining TC level 114. When formulating TC level 114, AC module 216 may first authenticate each of other devices 102B . . . n prior to accepting DC level 108B . . . n. Authentication may involve devices 102B . . . n providing information to allow device 102A' to authenticate that they are who they purport to be (e.g., to guard against spoofing wherein another device may try to impersonate one of devices 102B . . . n). After each of devices 102B . . . n has been authenticated, AC module 216 may then receive DC levels 108B . . . n and may formulate TC level 114 using the DC level it has computed based on its own data (e.g., DC level 108A) along with the received DC levels 108B . . . n. In at least one embodiment, more than one device 102A . . . n in possession of user 104 may comprise AC module 216 (e.g., such as a smart phone and a tablet computer). Devices 102A . . . n having AC module 216 may operate separately (e.g., one of devices 102A . . . n may assume responsibility for determining TC level 114 for all of devices 102A . . . n, TC level 114 may be available from any device 102A . . . n having AC module 216, etc.) or in unison (e.g., one of devices A . . . n may determine a partial TC level 114 based on a subset of devices 102A . . . n, and the partial TC level 114 may then be given to another device including AC module 216 to finish formulating TC level 114). Confidence module 106A' may also comprise access control module 218 alone or in combination with device confidence module 214 and/or AC module 216. Access control module 218 may control an operational mode of a device or system based on TC level 114. In at least one example implementation, a device may only comprise access control module 218 if its only function is to react to TC level 114 provided from at least one of devices 102A . . . n (e.g., as will be explained further in regard to FIGS. 3 and 4). In at least one embodiment, confidence module 106A' may interact with user interface module 208 and communication module 212. For example device confidence module 214 in confidence module 106A' may receive data 110A from at least DCM 112A that may exist, at least in part, within user interface module 208' (e.g., user 104 may manually enter data 110A via user interface 208', data 110A may be sensed by at least one sensor within, or at least coupled to, user interface 108', etc.) and may use data 110A when determining DC level 108A. Confidence module 106A' may cause communication module 212 to transmit DC level 108A to another device 102B . . . n, or alternatively, AC module 216 may receive DC levels 108B . . . n via communication module 212 for use in formulating TC level 114. Access control module 218 may also employ communication module 212 to receive TC level 114 from at least one device 102B . . . n seeking access to data in device 102A' or a system that may be linked to device 102A'.

Figure 3:
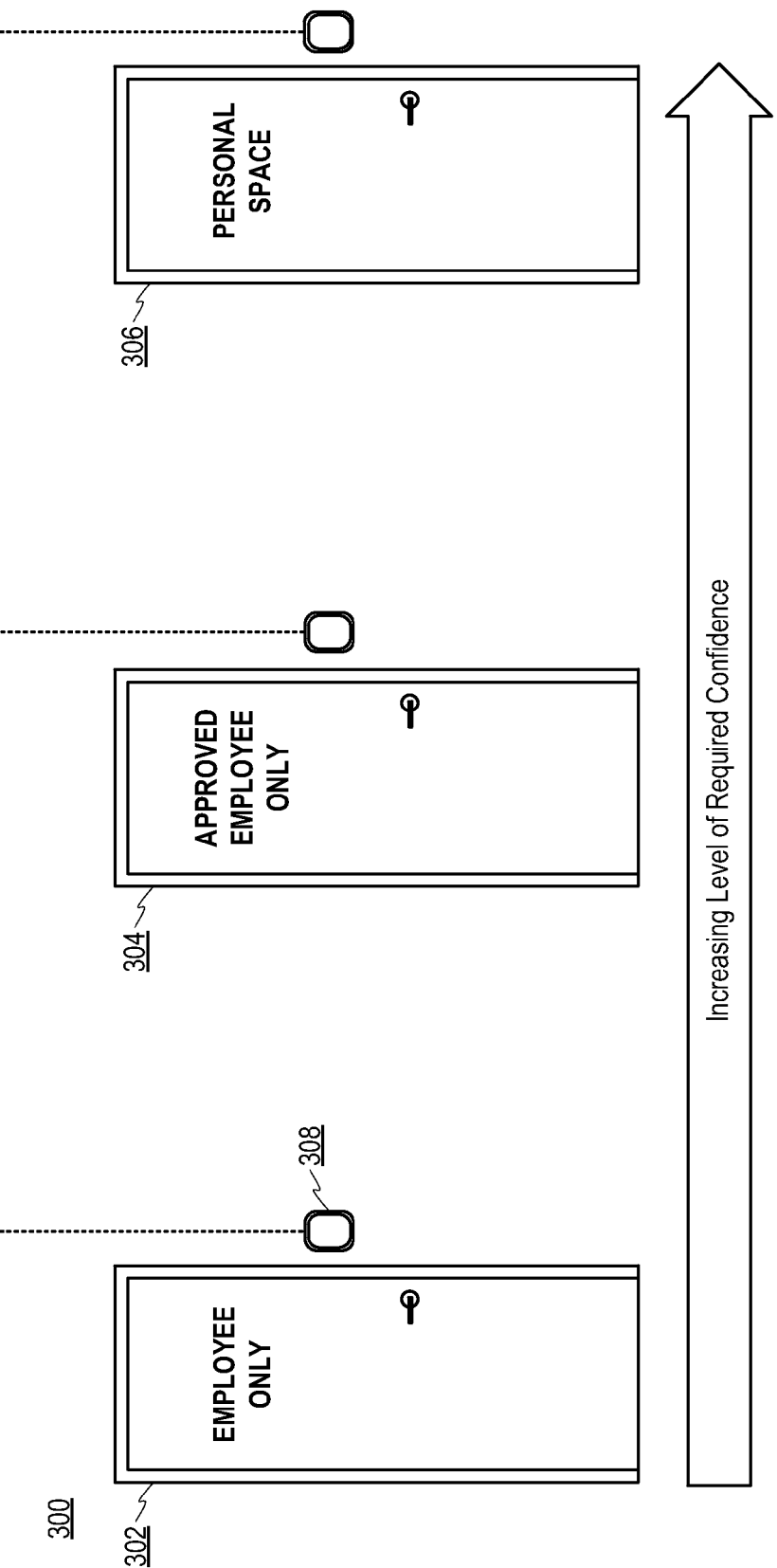
FIG. 3 illustrates an example implementation of user authentication confidence based on multiple devices in accordance with at least one embodiment of the present disclosure.

FIG. 3 illustrates an example implementation of user authentication confidence based on multiple devices in accordance with at least one embodiment of the present disclosure. Example entry access implementation 300 comprises a plurality of access points 302, 304 and 306 (e.g., doors) that may be controlled by an access control system 308 including access control module 218. While access points 302 to 306 refer to areas within a workplace, the type of system 308 described in FIG. 3 may be applicable to other situations as well. The level of confidence that may be required to access each area may increase from access points 302 to 306. User 104 may desire to access the areas secured by access points 302 to 306, and may provide TC level 114 to access control module 218 via security system 308. For example, at least one device 102A . . . n may be configured to convey, for example, identity data (e.g., user identification, employment area, an access code, etc.) for user 104 along with TC level 114 to security system 308 via short-range wireless communication. Whether or not user 104 is permitted to enter through access points 302 to 306 may be determined by security system 308. Once permission to enter is established based on the identity data, access control module 218 may then evaluate at least TC level 114 provided by user 104 to determine whether the level of confidence in user identity provided by TC level 114 is high enough to allow access to particular access points 302 to 306. In at least one embodiment, access control module 218 may process both the user identity data and TC level 114 to determine access permission.

For example, access point 302 may control access to allow in only employees of a certain company. In this scenario being an employee may be considered to be low level security access, and so the confidence required may be low. However, access point 304 may only grant access to approved employees (e.g., a subset of employees that are allowed to access a restricted area). As the security may be more substantial, more confidence that the identity of the user is authentic may be required. Access point 306 may pertain to a personal space of user 104 (e.g., the user's locker, office, lab, etc.). Access point 306 may require the highest level of permission as only user 104 should be allowed to enter this area. For example, access control module 218 may require TC level 114 to be higher than 90%. In this manner, a person in possession of devices 102A . . . n may enter access point 306 only when there is substantial confidence that the person is user 104.

In at least one embodiment, another measure of security may be employed by requiring a certain device 102A . . . n be in the possession of user 104 to gain access. For example, a company may issue a wearable device (e.g., RFID key integrated into an employee badge, a physiological monitor, an environmental monitor such as for monitoring radiation exposure, a locating device, etc.) to all of its employees. One or more access points 302 to 306 may require the presence of the required device in devices 102A . . . n (e.g., in the possession of user 104) in addition to TC level 114 provided by user 104 being at or above a certain confidence level. This requirement may allow the employer to specify at least one "trusted" device in devices 102A . . . n (e.g., a device that may be more difficult to spoof) to contribute to TC level 114 when determining user access permission. Alone or along with requiring a certain device, a context corresponding to device 102A . . . n and/or user 104 may be taken into consideration along with user identity and TC level 114 when determining an operational mode of a system (e.g., in example 300, whether to permit access to user 104). Context may characterize a type of activity, time, location, etc. in regard to devices 102A . . . n and/or user 104. For example, a large amount of sensed motion may indicate that user 104 is running or exercising while no motion being detected may indicate that user 104 is sitting or possibly sitting (e.g., the context of which may be further refined based on the current time), a determination that user 104 is at a location such as a restaurant or workplace may indicate that user 104 is eating, working, etc. Context may then be utilized as a determining factor for setting operational mode. For example, user 104 attempting to gain access to personal space access point 306 may be handled differently in the afternoon on a workday (e.g., 1:00 PM on a Tuesday) vs. midnight on the weekend (12:00 AM on Saturday) in that a substantially higher TC level 114 may be required by access control module 218 at times when it would be unusual for user 104 to be attempting to access personal space 306 (e.g., on Saturday at midnight).

Figure 4:
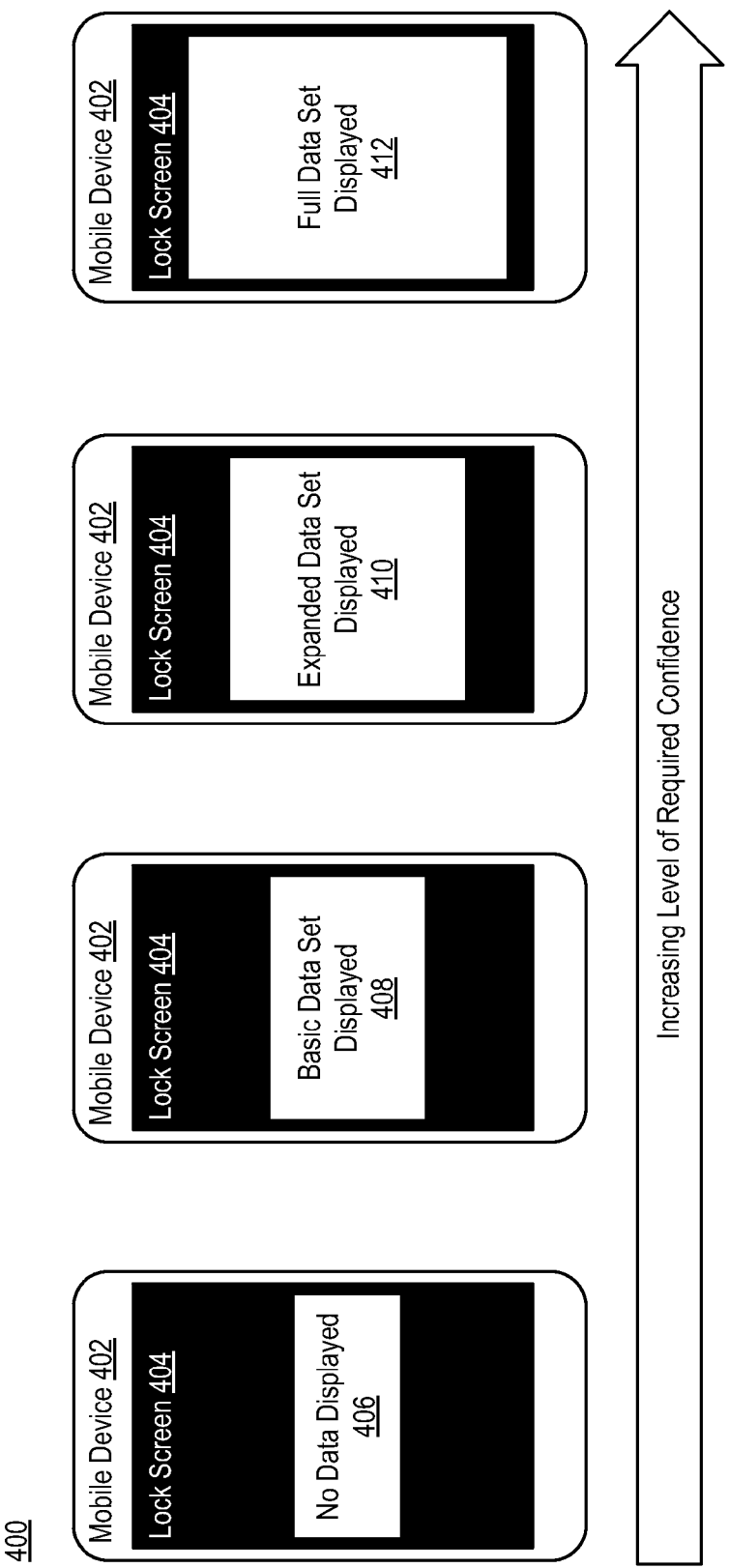
FIG. 4 illustrates another example implementation of user authentication confidence based on multiple devices in accordance with at least one embodiment of the present disclosure.

FIG. 4 illustrates another example implementation of user authentication confidence based on multiple devices in accordance with at least one embodiment of the present disclosure. Example implementation 400 discloses how confidence level may be employed to control access to devices 102A . . . n. Mobile device 402 may be one of devices 102A . . . n. By default, access mobile device 402 may be secured by lock screen 404. Lock screen 404 may always present certain information such as, for example, that access to mobile device 402 is currently secured by lock screen 404, the current time and/or date, connectivity information, etc. However, consistent with the present disclosure, lock screen 404 may display other information based on the level of confidence that the person in possession of mobile device 402 is user 104 (e.g., the owner of mobile device 402). Similar to FIG. 3, the level of confidence required to manifest the behavior disclosed for lock screens 404 may increase from the left side of FIG. 4 to the right side. As shown at 406, no additional data (other than the basic data disclosed above) may be displayed when there is little confidence in the authenticity of the identity of user 104. This may be a situation where user 104 does not currently possess multiple devices 102A . . . n (e.g., user 104 might only possess mobile device 402, other devices 102A . . . n may be low on power and not able to contribute to determining TC level 114, etc.), and so TC level 114 cannot be computed based on the contribution of other devices 102A . . . n, TC level 114 is computed but is not at a minimum level required by mobile device 402, at least one device 102A . . . n that is specified as required to gain access to mobile device 402 is not detected as currently being present in devices 102A . . . n, the current context of mobile device 402 specifies that access is not permitted or that TC level 114 is not a level high enough to permit access to mobile device 402, etc.

As illustrated at 408, a higher TC level 114 may result in lock screen 404 displaying a basic set of data. For context in explaining the present disclosure, the additional information displayed on lock screen 408 may pertain to recent unopened communications. For example, basic data set 408 may display a number of phone calls, emails and/or text messages that have been received by mobile device 402. Basic data set 408 does not display any information that may identify the source of the received communications. As the TC level increases, so does the confidence level that user 104 is in possession of mobile device 402. Expanded data set 410 may become available when TC level 114 is higher than the level needed to access basic data set 408. Expanded data set 410 may display information that further identifies sources of communications that have been received by mobile device 402. For example, a phone call may be presented on lock screen 404 as originating from "Mary" or an email may be identified as originating from "Josh." A full data set 412 may be displayed on lock screen 404 when there is a substantially high TC level 114 supporting that mobile device 402 is currently possessed by user 104. In general, full data set 412 may display information only for the eyes of user 104. For example, full data set 412 may display a variety of information about the communications received by mobile device 402 such as, for example, the names of callers and phone numbers for returning missed calls, people who sent emails and the subject lines of the emails, pending scheduled meetings with subject lines describing the context of the meetings, the content of texts and who sent the texts, etc. As described above, a TC level 114 required to access data sets 408 to 412 may be further influenced by the presence of a required device, the context of user 104 and/or mobile device 402, etc. For example, if mobile device 402 is determined to be in an unfamiliar location (e.g., not at home, school, work, etc.), then all required TC levels 114 may be elevated. While a received communication example has been used to described the general functionality disclosed in FIG. 4, embodiments consistent with the present disclosure are not limited only to controlling access to communication data, and may pertain to other usage scenarios related to, for example, access to certain applications on mobile device 402, access to personal/financial data on mobile device 402 (e.g., social security number, home address, personal/professional contacts, account numbers, passwords, web usage, etc.), access to proprietary information, etc.

Figure 5:
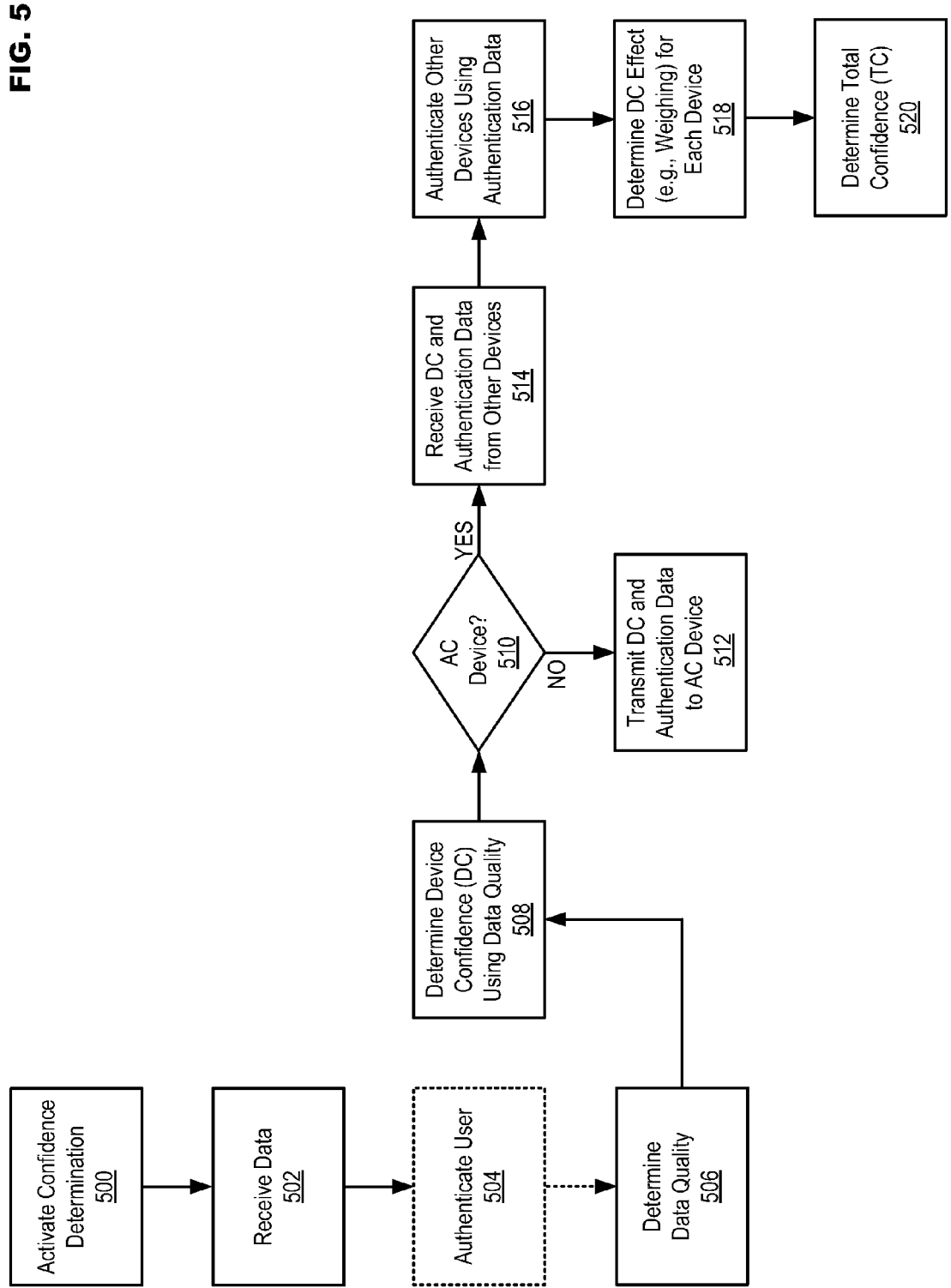
FIG. 5 illustrates example operations for determining device confidence and total confidence in accordance with at least one embodiment of the present disclosure.

FIG. 5 illustrates example operations for determining device confidence and total confidence in accordance with at least one embodiment of the present disclosure. In operation 500, confidence determination may be activated in a device. Confidence determination may be triggered by, for example, the device being activated, by a particular application in the device being activated, by the device sensing other devices within proximity, such as within a distance indicating possession by a user (e.g., via close-proximity or short-range wireless interaction), etc. In operation 502, data may then be received from a DCM in the device. For example, the DCM may provide biometric data collected from at least one sensor in the device. Operation 504 may be optional in that user authentication may occur elsewhere in the device (e.g., within a security subsystem in the device) rather than in the resources within the device responsible for confidence level determination (e.g., a confidence module). A quality of the data received in operation 502 may then be determined in operation 506. Data quality may be based on, for example, the type of data, a frequency at which the data was sampled, the accuracy of the data, whether another device can corroborate the data, etc. In operation 508, a DC level may then be determined based on at least the quality determined in operation 506.

A determination may then be made in operation 510 to determine whether the device is an AC device (e.g., comprises an AC module and is to perform AC functionality for devices in possession of the user). If it is determined in operation 510 that the device is not an AC device, then in operation 512 the device may transmit at least authentication data and the DC level to the AC device. If in operation 510 it is determined that the device is an AC device, then in operation 514 the device may receive authentication data and a DC level from other devices in possession of the user. The device may authenticate the other devices based on at least the authentication data in operation 516. An "effect" for each received DC level may be determined in operation 518. An effect may be, for example, a weighting used when aggregating the DC levels that were provided by the other devices. Weighting may be based on, for example, the data type, the data collection frequency, the accuracy of the data, whether the data can be substantiated by another device, etc. Determination of the effect may be based on, for example, an algorithm, systemic behavior learned by a learning engine, a rule-based determination, etc. Upon determination of the effect in operation 518, a TC level may then be determined by the device in operation 520.

Figure 6:
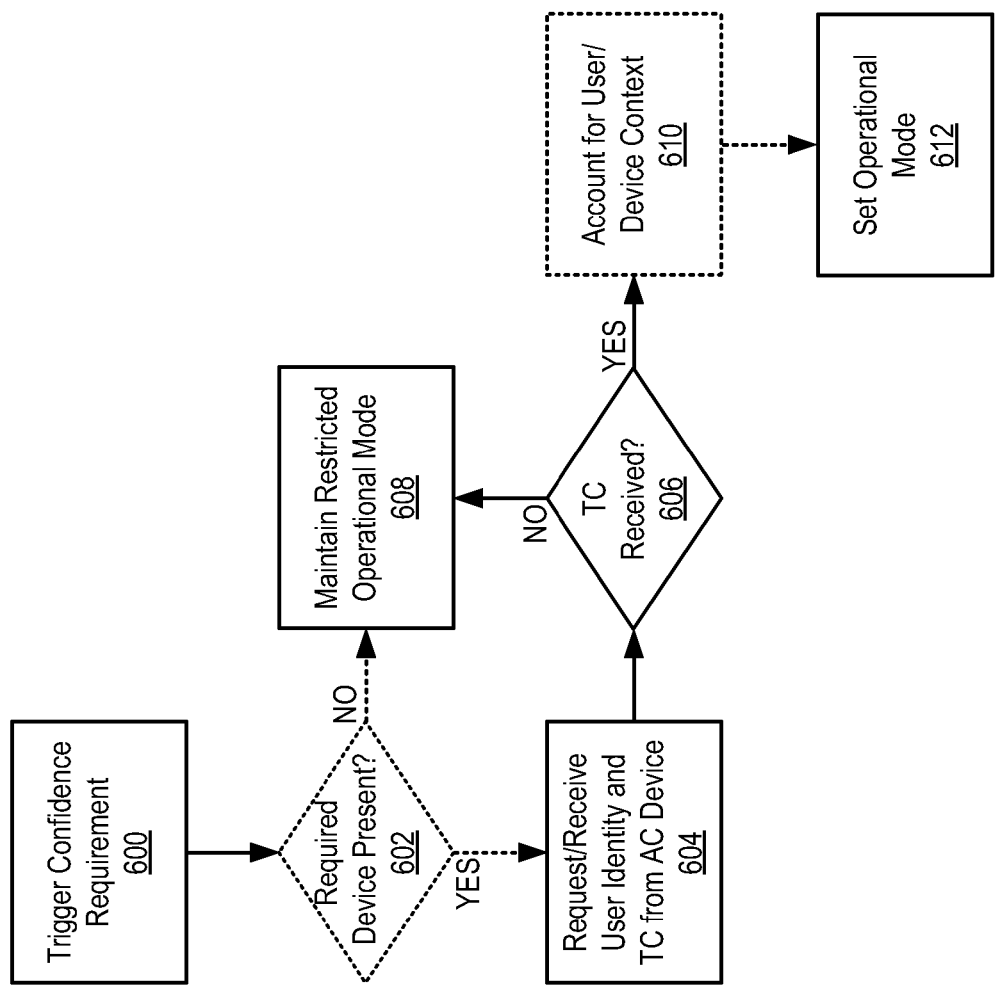
FIG. 6 illustrates example operations for controlling access based on total confidence in accordance with at least one embodiment of the present disclosure.

FIG. 6 illustrates example operations for controlling access based on total confidence in accordance with at least one embodiment of the present disclosure. A confidence requirement may be triggered in operation 600. For example, a user may be detected within proximity of an access control system, an attempt may be made to access a device and/or an application within the device, etc. Operation 602 may be optional in that requiring the presence of a certain device may be implementation-dependent, and thus, may not be applicable to all devices/systems consistent with the present disclosure. In operation 602 a determination may be made as to whether a required device is present (e.g., in possession of the user). If in operation 602 it is determined that the required device is not present, then in operation 608 a restricted operational mode may be maintained (e.g., the most restrictive level of access control). If in operation 602 it is determined that the required device is present, then in operation 604 a request may be made for user identity information, along with an AC corresponding to the user identity information, or alternatively, the identity information and AC may just be provided to the device without a request. If it is determined in operation 606 that no TC level was received in operation 604 then restricted mode operation may be maintained in operation 608. A determination in operation 606 that a TC level corresponding to the user identity was received may be followed by operation 610, which may be optional. Operation 610 may be optional in that accounting for a user/device context (e.g., when allowing access to a device/system, when determining required TC level for allowing access to the system, etc.) may be implementation-dependent, and thus, may not be applicable to all devices/systems consistent with the present disclosure. In operation 612, an operational mode may be set based on user identity, TC level, and if applicable, the user/device context determined in operation 610. For example, a range of operational modes may exist in the device/system that grant increasing access permission corresponding to increasing TC levels, and the device/system may set a particular operational mode based on the user identity and TC level.

While FIGS. 5 and 6 illustrate operations according to different embodiments, it is to be understood that not all of the operations depicted in FIGS. 5 and 6 are necessary for other embodiments. Indeed, it is fully contemplated herein that in other embodiments of the present disclosure, the operations depicted in FIGS. 5 and 6, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present application is directed to user authentication confidence based on multiple devices. A user may possess at least one device. The device may determine a device confidence level that the identity of the user is authentic based on at least data collected by a data collection module in the device. For example, a confidence module in the device may receive the data from the data collection module, determine a quality corresponding to the data and determine the device confidence level based on the quality. If the user possesses two or more devices, at least one of the devices may collect device confidence levels from other devices to determine a total confidence level. For example, a device may authenticate the other devices and then receive device confidence levels for use in determining the total confidence level, which may be used to set an operational mode in a device or system.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for user authentication confidence based on multiple devices, as provided below.

According to example 1 there is provided a device for determining confidence of user identity. The device may comprise a communication module to interact with at least one other device, a data collection module to collect data for use in determining an identity of a user in possession of the device and a confidence module to at least receive the data from the data collection module and determine a device confidence level that the identity of the user is authentic based on at least the data.

Example 2 may include the elements of example 1, wherein the data comprises biometric data sensed by at least one sensor in the device.

Example 3 may include the elements of any of examples 1 to 2, wherein the data comprises user identification data entered by the user into the device.

Example 4 may include the elements of any of examples 1 to 3, wherein the confidence module comprises at least a device confidence module to determine the device confidence level that the identity of the user is authentic based on at least the data.

Example 5 may include the elements of any of examples 1 to 4, wherein the confidence module comprises a device confidence module to at least determine a quality of the data and determine the device confidence level based on at least the data quality.

Example 6 may include the elements of example 5, wherein the data quality is determined based on at least one of data type, data frequency, data accuracy and data consistency.

Example 7 may include the elements of example 6, wherein data consistency is determined based on comparing data collected by the device to similar data collected by the at least one other device.

Example 8 may include the elements of any of examples 1 to 7, wherein the confidence module is further to cause the communication module to transmit at least the device confidence level to the at least one other device.

Example 9 may include the elements of any of examples 1 to 8, wherein the confidence module further comprises an authentication and collection module to at least receive at least one device confidence level from the at least one other device and determine a total confidence level based on the device confidence level determined in the device and the at least one device confidence level received from the at least one other device.

Example 10 may include the elements of example 9, wherein the authentication and collection module is further to determine the total confidence level based on determining an effect on the total confidence level for each of the device confidence level determined by the device and the device confidence level received from the at least one other device, wherein the effect is based on at least one of weighting each device confidence level, a machine-learning determination of the effect or a rules-based determination of the effect.

Example 11 may include the elements of any of examples 9 to 10, wherein the authentication and collection module is further to receive authentication data from the at least one other device and authenticate the at least one other device based on the authentication data prior to determining the total confidence level.

Example 12 may include the elements of any of examples 1 to 11, wherein the confidence module is further to set an operational mode in the device based on at least the identity of the user in possession of the device and the confidence level.

Example 13 may include the elements of example 12, wherein the confidence module is further to set the operational mode also based on a context of at least one of the device or the user.

Example 14 may include the elements of any of examples 1 to 13, wherein the confidence module comprises a device confidence module to at least determine a quality of the data, wherein the data quality is determined based on at least one of data type, data frequency, data accuracy and data consistency and determine the device confidence level based on at least the data quality.

Example 15 may include the elements of any of examples 1 to 14, wherein the confidence module further comprises an authentication and collection module to at least receive authentication data from the at least one other device, authenticate the at least one other device based on the authentication data, receive at least one device confidence level from the at least one other device and determine a total confidence level based on the device confidence level determined in the device and the at least one device confidence level received from the at least one other device.

According to example 16 there is provided an access control device. The device may comprise a communication module to interact with at least one other device and a confidence module to at least receive data identifying a user in possession of the at least one other device and a confidence level that the data identifying the user is authentic via the communication module and set an operational mode in the device based on at least the user identity data and the confidence level.

Example 17 may include the elements of example 16, wherein the confidence module comprises at least an access control module to set the operational mode in the device based on at least the user identity data and the confidence level.

Example 18 may include the elements of any of examples 16 to 17, wherein the confidence module is further to determine whether the user is in possession of a required device; and set the operational mode based further on whether the required device is determined to be in possession of the user.

Example 19 may include the elements of any of examples 16 to 18, wherein the operational mode is set by the confidence module based further on a context of at least one of the device or user determined based on at least the data.

Example 20 may include the elements of any of examples 16 to 19, wherein the operational mode comprises a plurality of increasing levels of access set corresponding to at least the confidence level.

Example 21 may include the elements of any of examples 16 to 20, wherein the confidence level is determined based on at least a quality determined for data used in determining the identity of the user in possession of the at least one other device collected by a data collection module in the at least one other device.

Example 22 may include the elements of example 21, wherein the data quality is determined based on at least one of data type, data frequency, data accuracy and data consistency.

According to example 23 there is provided a method for determining confidence of user identity. The method may comprise receiving data for use in determining an identity of a user in possession of a device from a data collection module in the device, determining a quality corresponding to the data and determining a device confidence level that the identity of the user is authentic based on at least the quality.

Example 24 may include the elements of example 23, wherein the data comprises biometric data sensed by at least one sensor in the device.

Example 25 may include the elements of any of examples 23 to 24, wherein the data comprises user identification data entered by the user into the device.

Example 26 may include the elements of any of examples 23 to 25, wherein data quality is determined based on at least one of data type, data frequency, data accuracy and data consistency.

Example 27 may include the elements of example 26, wherein data consistency is determined based on comparing data collected by the device to similar data collected by the at least one other device.

Example 28 may include the elements of any of examples 23 to 27, and may further comprise transmitting at least the device confidence level to at least one other device.

Example 29 may include the elements of any of examples 23 to 28, and may further comprise receiving at least one device confidence level from at least one other device and determining a total confidence level based on the device confidence level determined in the device and the at least one device confidence level received from the at least one other device.

Example 30 may include the elements of example 29, wherein determining the total confidence level is based on determining an effect on the total confidence level for each of the device confidence level determined by the device and the device confidence level received from the at least one other device, wherein the effect is based on at least one of weighting each device confidence level, a machine-learning determination of the effect or a rules-based determination of the effect.

Example 31 may include the elements of any of examples 29 to 30, and may further comprise receiving authentication data from the at least one other device and authenticating the at least one other device based on the authentication data prior to determining the total confidence level.

Example 32 may include the elements of any of examples 23 to 31, and may further comprise setting an operational mode in the device based on at least the identity of the user in possession of the device and the confidence level.

Example 33 may include the elements of example 32, and may further comprise setting the operational mode also based on a context of at least one of the device or the user.

Example 34 may include the elements of any of examples 23 to 33, and may further comprise receiving authentication data from the at least one other device, authenticating the at least one other device based on the authentication data, receiving at least one device confidence level from at least one other device and determining a total confidence level based on the device confidence level determined in the device and the at least one device confidence level received from the at least one other device.

According to example 35 there is provided a method for access control. The method may comprise receiving, in a device, at least data identifying a user in possession of at least one other device and a confidence level that the data identifying the user is authentic and setting, in the device, an operational mode based on at least the user identity data and the confidence level.

Example 36 may include the elements of example 35, and may further comprise determining whether the user is in possession of a required device and setting the operational mode based further on whether the required device is determined to be in possession of the user.

Example 37 may include the elements of any of examples 35 to 36, and may further comprise setting the operational mode based further on a context of at least one of the device or user determined based on at least the data.

Example 38 may include the elements of any of examples 35 to 37, wherein the operational mode comprises a plurality of increasing levels of access to data in the device set corresponding to at least the confidence level.

Example 39 may include the elements of any of examples 35 to 38, wherein the confidence level is determined based on at least a quality determined for data used in determining the identity of the user in possession of the at least one other device collected by a data collection module in the at least one other device.

Example 40 may include the elements of example 39, wherein the data quality is determined based on at least one of data type, data frequency, data accuracy and data consistency.

According to example 41 there is provided a system including at least one device, the system being arranged to perform the method of any of the above examples 23 to 40.

According to example 42 there is provided a chipset arranged to perform the method of any of the above examples 23 to 40.

According to example 43 there is provided at least one machine readable medium comprising a plurality of instructions that, in response to be being executed on a computing device, cause the computing device to carry out the method according to any of the above examples 23 to 40.

According to example 44 there is provided at least one device configured for user authentication confidence based on multiple devices, the device being arranged to perform the method of any of the above examples 23 to 40.

According to example 45 there is provided a system for determining confidence of user identity. The system may comprise means for receiving data for use in determining an identity of a user in possession of a device from a data collection module in the device, means for determining a quality corresponding to the data and means for determining a device confidence level that the identity of the user is authentic based on at least the quality.

Example 46 may include the elements of example 45, wherein the data comprises biometric data sensed by at least one sensor in the device.

Example 47 may include the elements of any of examples 45 to 46, wherein the data comprises user identification data entered by the user into the device.

Example 48 may include the elements of any of examples 45 to 47, wherein data quality is determined based on at least one of data type, data frequency, data accuracy and data consistency.

Example 49 may include the elements of any of examples 48, wherein data consistency is determined based on comparing data collected by the device to similar data collected by the at least one other device.

Example 50 may include the elements of any of examples 45 to 49, and may further comprise means for transmitting at least the device confidence level to at least one other device.

Example 51 may include the elements of any of examples 45 to 50, and may further comprise means for receiving at least one device confidence level from at least one other device; and means for determining a total confidence level based on the device confidence level determined in the device and the at least one device confidence level received from the at least one other device.

Example 52 may include the elements of example 51, wherein determining the total confidence level is based on determining an effect on the total confidence level for each of the device confidence level determined by the device and the device confidence level received from the at least one other device, wherein the effect is based on at least one of weighting each device confidence level, a machine-learning determination of the effect or a rules-based determination of the effect.

Example 53 may include the elements of any of examples 51 to 52 and may further comprise means for receiving authentication data from the at least one other device and means for authenticating the at least one other device based on the authentication data prior to determining the total confidence level.

Example 54 may include the elements of any of examples 45 to 53, and may further comprise means for setting an operational mode in the device based on at least the identity of the user in possession of the device and the confidence level.

Example 55 may include the elements of example 54, and may further comprise means for setting the operational mode also based on a context of at least one of the device or the user.

Example 56 may include the elements of any of examples 45 to 55 and may further comprise means for receiving authentication data from the at least one other device, means for authenticating the at least one other device based on the authentication data, means for receiving at least one device confidence level from at least one other device and means for determining a total confidence level based on the device confidence level determined in the device and the at least one device confidence level received from the at least one other device.

According to example 57 there is provided a system for access control. The system may comprise means for receiving, in a device, at least data identifying a user in possession of at least one other device and a confidence level that the data identifying the user is authentic and means for setting, in the device, an operational mode based on at least the user identity data and the confidence level.

Example 58 may include the elements of example 57, and may further comprise means for determining whether the user is in possession of a required device and means for setting the operational mode based further on whether the required device is determined to be in possession of the user.

Example 59 may include the elements of any of examples 57 to 58, and may further comprise means for setting the operational mode based further on a context of at least one of the device or user determined based on at least the data.

Example 60 may include the elements of any of examples 57 to 59, wherein the operational mode comprises a plurality of increasing levels of access to data in the device set corresponding to at least the confidence level.

Example 61 may include the elements of any of examples 57 to 60, wherein the confidence level is determined based on at least a quality determined for data used in determining the identity of the user in possession of the at least one other device collected by a data collection module in the at least one other device.

Example 62 may include the elements of example 61, wherein the data quality is determined based on at least one of data type, data frequency, data accuracy and data consistency.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device for determining confidence of user identity, comprising:
communication circuitry to interact with at least one other device;
data collection circuitry to collect data for use in determining an identity of a user in possession of the device;
confidence circuitry to at least:
receive the data from the data collection circuitry; and
determine a device confidence level that the identity of the user is authentic based on at least the data; and
authentication and collection circuitry to at least:
receive at least one device confidence level from the at least one other device; and
determine a total confidence level based on the device confidence level determined in the device and the at least one device confidence level received from the at least one other device.

2. The device of claim 1, wherein the data comprises biometric data sensed by at least one sensor in the device.

3. The device of claim 1, wherein the confidence circuitry comprises device confidence circuitry to at least:
determine a quality of the data; and
determine the device confidence level based on at least the data quality.

4. The device of claim 3, wherein the data quality is determined based on at least one of data type, data frequency, data accuracy and data consistency.

5. The device of claim 1, wherein the confidence circuitry is further to cause the communication circuitry to transmit at least the device confidence level to the at least one other device.

6. The device of claim 1, wherein the authentication and collection circuitry is further to:
receive authentication data from the at least one other device; and
authenticate the at least one other device based on the authentication data prior to determining the total confidence level.

7. The device of claim 1, wherein the confidence circuitry is further to set an operational mode in the device based on at least the identity of the user in possession of the device and the confidence level.

8. The device of claim 7, wherein the confidence circuitry is further to set the operational mode also based on a context of at least one of the device or the user.

9. A method for determining confidence of user identity, comprising:
receiving data for use in determining an identity of a user in possession of a device from data collection circuitry in the device;
determining a quality corresponding to the data;
determining a device confidence level that the identity of the user is authentic based on at least the quality;
receiving at least one device confidence level from at least one other device; and
determining a total confidence level based on the device confidence level determined in the device and the at least one device confidence level received from the at least one other device.

10. The method of claim 9, wherein the data comprises biometric data sensed by at least one sensor in the device.

11. The method of claim 9, wherein data quality is determined based on at least one of data type, data frequency, data accuracy and data consistency.

12. The method of claim 9, further comprising:
transmitting at least the device confidence level to at least one other device.

13. The method of claim 9, further comprising:
receiving authentication data from the at least one other device; and
authenticating the at least one other device based on the authentication data prior to determining the total confidence level.

14. At least one machine-readable storage medium having stored thereon, individually or in combination, instructions for determining confidence of user identity that, when executed by one or more processors, cause the one or more processors to:

receive data for use in determining an identity of a user in possession of a device from data collection circuitry in the device;

determine a quality corresponding to the data;

determine a device confidence level that the identity of the user is authentic based on at least the quality;

receive at least one device confidence level from at least one other device; and determine a total confidence level based on the device confidence level determined in the device and the at least one device confidence level received from the at least one other device.

15. The medium of claim 14, wherein the data comprises biometric data sensed by at least one sensor in the device.

16. The medium of claim 14, wherein data quality is determined based on at least one of data type, data frequency, data accuracy and data consistency.

17. The medium of claim 14, further comprising instructions that, when executed by one or more processors, cause the one or more processors to:

transmit at least the device confidence level to at least one other device.

18. The medium of claim 14, further comprising instructions that, when executed by one or more processors, cause the one or more processors to:

receive authentication data from the at least one other device; and authenticate the at least one other device based on the authentication data prior to determining the total confidence level.

19. The medium of claim 14, further comprising instructions that, when executed by one or more processors, cause the one or more processors to:

set an operational mode in the device based on at least the identity of the user in possession of the device and the confidence level.

20. The medium of claim 19, further comprising instructions that, when executed by one or more processors, cause the one or more processors to:

set the operational mode also based on a context of at least one of the device or the user.

* * * * *